(12) United States Patent
Nambara (10) Patent No.: US 10,234,684 B2
(45) Date of Patent: Mar. 19, 2019

(54) PROJECTION MEMBER, HEAD UP DISPLAY DEVICE, AND POLARIZED SUNGLASSES

(71) Applicant: DENSO CORPORATION, Kariya, Aichi-pref. (JP)

(72) Inventor: Takahiro Nambara, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 83 days.

(21) Appl. No.: 15/265,942

(22) Filed: Sep. 15, 2016

(65) Prior Publication Data

US 2018/0074313 A1 Mar. 15, 2018

(51) Int. Cl.
*G02B 5/30* (2006.01)
*G02C 7/12* (2006.01)
*G02B 27/01* (2006.01)

(52) U.S. Cl.
CPC ....... *G02B 27/0101* (2013.01); *G02B 5/3083* (2013.01); *G02C 7/12* (2013.01); *G02B 2027/012* (2013.01)

(58) Field of Classification Search
CPC ........ G02B 5/3083; G02B 1/04; G02B 5/305; G02B 5/3033; G02B 5/3016; G02B 1/08; G02B 1/14; G02B 5/3041; G02B 5/3025; G02B 27/26; G02B 5/32; G02B 27/283; G02B 5/30; G02B 1/11; G02B 27/286; G02B 5/045; G02B 1/10; G02B 1/105; G02F 1/13363; G02F 1/133528; G02F 2001/133638; G02F 1/133634; G02F 2001/133637; G02F 2001/133541;
(Continued)

(56) References Cited

U.S. PATENT DOCUMENTS

2006/0216437 A1* 9/2006 Murakami ......... C09K 19/3068
428/1.3
2016/0349507 A1* 12/2016 Hayashi ................. G02B 27/01

FOREIGN PATENT DOCUMENTS

JP S61188118 U 11/1986
JP H02141720 A 5/1990
(Continued)

OTHER PUBLICATIONS

PO 2015 225236 English machine translation.*

*Primary Examiner* — Thomas K Pham
*Assistant Examiner* — Sharrief I Broome
(74) *Attorney, Agent, or Firm* — Harness, Dickey & Pierce, P.L.C.

(57) ABSTRACT

A head up display device mounted in a moving body uses a source light to project an image onto a projection member to display a virtual image so that the image is visible to a passenger, the projection member including a first transparent plate that maintains polarization state and has a first surface facing the passenger, a second transparent plate that maintains polarization state and has a second surface opposite to the first surface, and a waveplate interposed between the first and seconds transparent plates and including a fast axis and a slow axis that delays phase with respect to the fast axis, wherein the source light is emitted toward the first surface obliquely along a plane of incidence, the source light including an s-polarization component and a p-polarization component, and the slow axis of the waveplate is inclined with respect to the plane of incidence.

10 Claims, 9 Drawing Sheets

(58) Field of Classification Search
CPC ..... G02F 2001/133635; G02F 1/13338; G02F 1/134363; G02F 2001/133507; G02F 2001/133633; G02F 2201/50; G02F 2202/40

See application file for complete search history.

(56) References Cited

FOREIGN PATENT DOCUMENTS

| | | | |
|---|---|---|---|
| JP | H10-096874 | | 4/1998 |
| JP | 2015-225236 A | | 12/2015 |
| JP | 2015225236 A | * | 12/2015 |

\* cited by examiner

PROJECTION MEMBER, HEAD UP DISPLAY DEVICE, AND POLARIZED SUNGLASSES

CROSS-REFERENCE TO RELATED APPLICATION

The present application is based on Japanese patent application No. 2014-110317 filed on May 28, 2014, the content of which is incorporated herein by reference.

TECHNICAL FIELD

The present disclosure relates to a projection member, a head up display (HUD) device, and polarized sunglasses.

BACKGROUND

Conventionally, it is known that a HUD device, which uses a source light to display an image as a virtual image visible to a passenger, may include a projection member on which the virtual image is projected. A projection member disclosed in JP H10-96874 A includes a first transparent plate having a first surface on a front side facing a passenger and a second transparent plate having a second surface on a rear side opposite to the front side. Here, the first transparent plate and the second transparent plate maintain polarization state. This projection member also includes a waveplate interposed between the first and second transparent plates. The waveplate includes a fast axis and a slow axis that retards phase with respect to the fast axis. Then, an s-polarized source light enters the first surface obliquely along the plane of incidence. Here, the waveplate is a ½ wavelength plate that rotates polarization direction by 90°.

SUMMARY

According to the projection member disclosed in JP H10-96874, the source light passing through the waveplate becomes a p-polarized light component. As such, a reflection ratio at the second surface on the rear side is reduced as compared to a reflection ratio at the first surface on the front side. Accordingly, it is possible to suppress the formation of a double image. However, since the reflection ratio at the second surface on the rear side is reduced, the brightness of the virtual image decreases, and there is a concern that the visibility of the virtual image may be insufficient.

Further, if a passenger is wearing polarized sunglasses which typically have a blocking axis fixed in the horizontal direction, it may be difficult to see the virtual image with only s-polarized light.

In view of the above, it is an object of the present disclosure to provide a projection member, a HUD device, and polarized sunglasses that improve the visibility of a virtual image.

In one aspect of the present disclosure, a projection member for use with a head up display device mounted in a moving body, the head up display device using a source light to project an image onto the projection member to display a virtual image so that the image is visible to a passenger, includes a first transparent plate that maintains polarization state, the first transparent plate including a first surface on a front side facing the passenger, a second transparent plate that maintains polarization state, the second transparent plate including a second surface on a rear side opposite to the front side, and a waveplate interposed between the first transparent plate and the second transparent plate, the waveplate including a fast axis and a slow axis that delays phase with respect to the fast axis, wherein the source light is emitted toward the first surface obliquely along a plane of incidence, the source light including an s-polarization component and a p-polarization component, and the slow axis of the waveplate is inclined with respect to the plane of incidence.

According to this aspect of the present disclosure, the first transparent plate which maintains polarization state includes the first surface on the front side. The source light, which includes both an s-polarization component and a p-polarization component, enters the first surface obliquely along the plane of incidence. Primarily the s-polarization component of the source light is reflected at the first surface, and primarily the p-polarization component passes through the first transparent plate. Here, the waveplate is interposed between the first transparent plate and the second transparent plate. The waveplate includes the slow axis which is inclined with respect to the plane of incidence. Due to the effect of this waveplate, the polarization direction of the source light which primarily includes the p-polarization component that passed through the first transparent plate is rotated toward s-polarization. Further, the second transparent plate includes the second surface on the rear side, and due to the second transparent plate which maintains polarization state, the source light which passed through the waveplate and was rotated toward s-polarization is reflected toward the front side at the second surface with a high reflection ratio. Accordingly, it is possible to increase the brightness of the virtual image observed by the passenger. Accordingly, the visibility of the virtual image may be increased.

In addition, the source light reflected at the second surface of the rear side passes through the waveplate again, and the polarization direction of this source light is rotated back toward p-polarization due to the effect of the waveplate, which includes the slow axis that is tilted with respect to the p-polarization plane of incidence. Accordingly, especially when the passenger is wearing typical polarization sunglasses, both source light primarily including s-polarization component reflected at the first surface of the front side and source light primarily including p-polarization component reflected at the second surface of the rear side enter the typical polarization sunglasses, so that the virtual image may be observed.

According to another aspect of the present disclosure, a head up display device is mounted on a moving body, the head up display device projecting an image onto a projection member to display a virtual image so that the image is visible to a passenger, the head up display device including a light source that emits a source light, and an optical system that projects the source light to the projection member, wherein the projection member includes a first transparent plate that maintains polarization state, the first transparent plate including a first surface on a front side facing the passenger, a second transparent plate that maintains polarization state, the second transparent plate including a second surface on a rear side opposite to the front side, and a waveplate interposed between the first transparent plate and the second transparent plate, the waveplate including a fast axis and a slow axis that delays phase with respect to the fast axis, and the light source emits the source light to the first surface obliquely along a plane of incidence, the plane of incidence being inclined with respect to the slow axis, the source light including an s-polarization component and a p-polarization component.

Further, according to this aspect of the present disclosure, the light source emits the source light, which is emitted by the optical system into the first surface obliquely along the plane of incidence. In addition, the optical system emits the source light to include both an s-polarization component and a p-polarization component. In this regard, primarily the s-polarization component of the source light is reflected at the first surface, and primarily the p-polarization component passes through the first transparent plate. Here, the waveplate is interposed between the first transparent plate and the second transparent plate. The waveplate includes the slow axis which is inclined with respect to the plane of incidence. Due to the effect of this waveplate, the polarization direction of the source light which primarily includes the p-polarization component that passed through the first transparent plate is rotated toward s-polarization. Further, the second transparent plate includes the second surface on the rear side, and due to the second transparent plate which maintains polarization state, the source light which passed through the waveplate and which was rotated toward s-polarization is reflected toward the front side at the second surface with a high reflection ratio. Accordingly, it is possible to increase the brightness of the virtual image observed by the passenger. Accordingly, the visibility of the virtual image may be increased.

In addition, the source light reflected at the second surface of the rear side passes through the waveplate again, and the polarization direction of this source light is rotated back toward p-polarization due to the effect of the waveplate, which includes the slow axis that is tilted with respect to the p-polarization plane of incidence. Accordingly, especially when the passenger is wearing typical polarization sunglasses, both source light primarily including s-polarization component reflected at the first surface of the front side and source light primarily including p-polarization component reflected at the second surface of the rear side enter the typical polarization sunglasses, so that the virtual image may be observed.

According to another aspect of the present disclosure, polarized sunglasses are for use with a head up display device mounted on a moving body, the head up display device using a source light to project an image onto a projection member to display a virtual image so that the image is visible to a passenger, the polarized sunglasses having a polarizer including a transmission axis that, when an incident light is emitted toward eyes of the passenger, allows the incidence light to pass through based on a polarization direction of the incident light, and a blocking axis that blocks the incidence light based on the polarization direction of the incident light, wherein the projection member comprises a first transparent plate that maintains polarization state, the first transparent plate including a first surface on a front side facing the passenger, a second transparent plate that maintains polarization state, the second transparent plate including a second surface on a rear side opposite to the front side, and a waveplate interposed between the first transparent plate and the second transparent plate, the waveplate including a fast axis and a slow axis that delays phase with respect to the fast axis, and the blocking axis is set according to a retardation value of the waveplate.

Even when wearing polarized sunglasses, equipped with the moving body, which typically has a blocking axis fixed in the horizontal direction, when external light due to reflection of sunlight on a water surface, a snow surface, etc. in the scenery in front of the moving body passes through the projection member, the polarization direction of this external light is changed due to the waveplate. Accordingly, the polarized sunglasses may be rendered ineffective. In this regard, the polarized sunglasses is configured such that the blocking axis is set in accordance with the retardation value of the waveplate. Accordingly, the polarized sunglasses is able to block bright external light due to reflection of sunlight on a water surface, a snow surface, etc. As a result, the contrast of the virtual image may be increased to improve visibility.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Hereinafter, a plurality of embodiments of the present disclosure will be explained with reference to the figures. Corresponding portions of each embodiment are denoted with the same reference numerals, and overlapping explanations may be omitted for brevity. If only a portion of the configuration of an embodiment is described, the configurations of previously described embodiments may be applied to the other portions of this configuration. The embodiments are not limited to combinations of portions which are specifically stated as being combinable. Instead, even without being stated, portions of embodiments may be combined with each other provided that no particular problem occurs for those combinations.

First Embodiment

Figure 1:
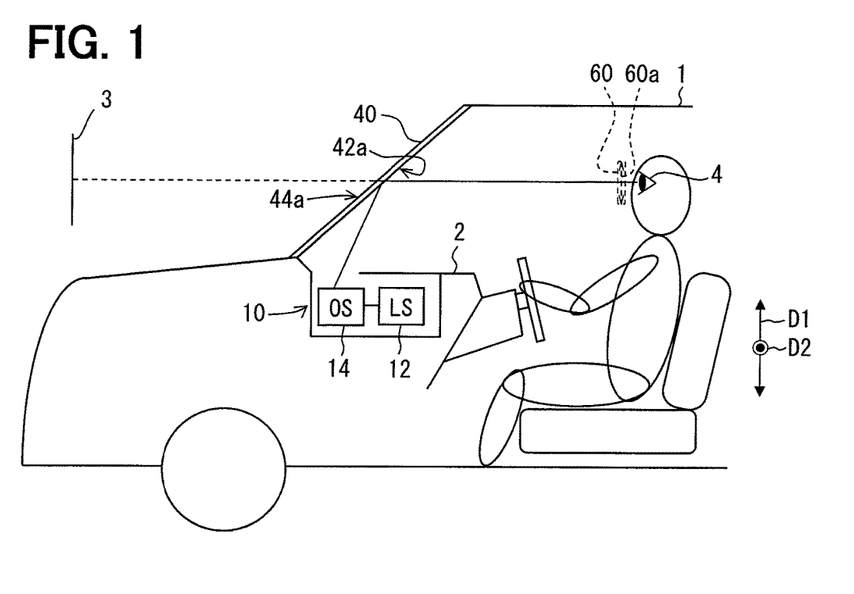
FIG. 1 is a schematic view showing a HUD device and a projection member mounted on a vehicle according to a first embodiment.

As shown in FIG. 1, a HUD device 10 according to a first embodiment of the present disclosure is mounted on a moving body such as a vehicle 1, and is housed within an instrument panel 2. The HUD device 10 uses a source light to project an image onto a projection member 40, thereby displaying the image as a virtual image visible to a passenger. In other words, the source light is reflected at the projection member 40 as the image, and reaches the eyes 4 of the passenger in the vehicle cabin of the vehicle 1 to be perceived by the passenger. Accordingly, the passenger is able to recognize a variety of information represented by the virtual image. The information represented as the virtual image includes, for example, vehicle status values such as vehicle speed and remaining fuel, and vehicular information such as road information or vision assistance information.

Figure 2:
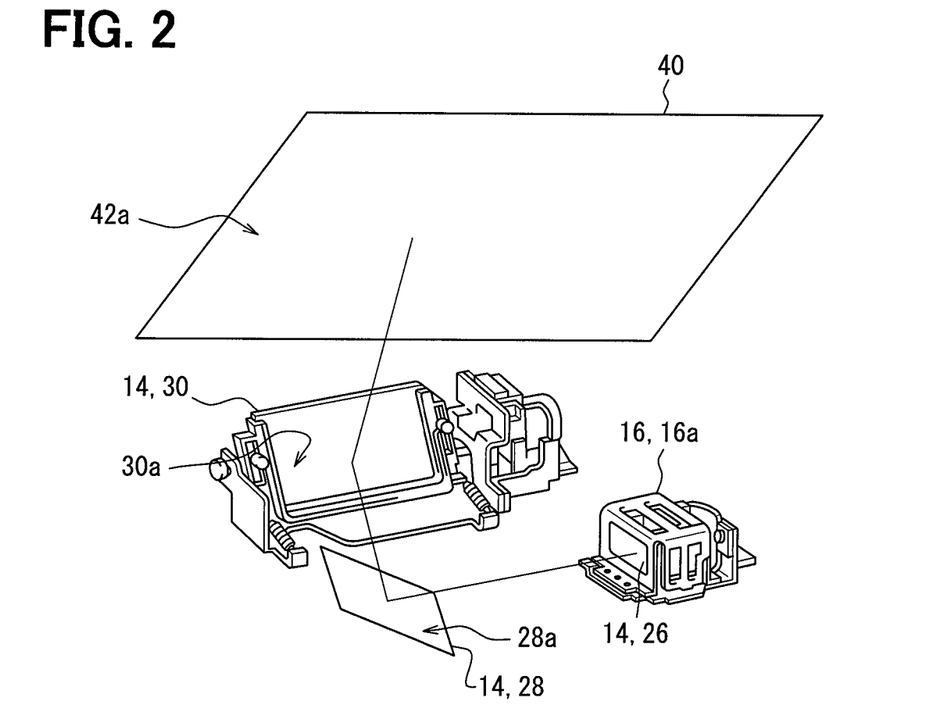
FIG. 2 is a perspective view showing the configuration a HUD device according to a first embodiment.
Figure 3:
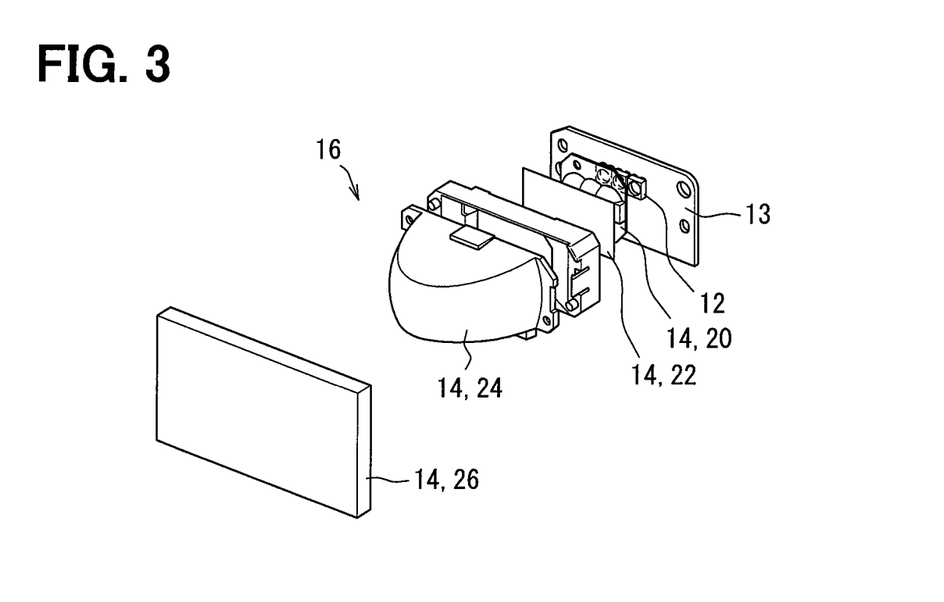
FIG. 3 is a perspective view showing the configuration a projector according to a first embodiment.

As shown in FIGS. 2 and 3, the HUD device 10 includes a light source 12 and an optical system 14. As shown in FIG. 3, the light source 12 is a light emitting element such as a light emitting diode (LED), and is disposed on a light source circuit board 13. The light source 12 is electrically connected to a control circuit and a power source (not illustrated) through a wiring pattern (not illustrated) on the light source circuit board 13. The light source 12 is energized to generated the source light. The amount of light generated corresponds to the current energizing the light source 12. Accordingly, the light source 12 projects the source light toward the optical system 14. For example, the light source 12 may include a blue LED covered by a fluorescent material to generate a pseudo-white light.

As shown in FIGS. 2 and 3, the optical system 14 includes a condenser lens 20, a diffusion plate 22, a projection lens 24, a liquid crystal panel 26, a plane mirror 28, and a concave mirror 30. The optical system 14 directs the source light from the light source 12 toward the projection member 40.

Here, the light source 12, the condenser lens 20, the diffusion plate 22, the projection lens 24, and the liquid crystal panel 26 are housed within a box-shaped projector case 16a to form a projector 16 as shown in FIG. 3.

The condenser lens 20 is a transparent convex lens made of a synthetic resin, glass, etc. The condenser lens 20 is disposed between the light source 12 and the diffusion plate 22 in the projector 16. The condenser lens 20 collects the source light from the light source 12 and emits the source light toward the diffusion plate 22.

The diffusion plate 22 is a semi-transparent or milky plate formed by embedding light scattering material into a synthetic resin such as polycarbonate. The diffusion plate 22 is disposed between the condenser lens 20 and the projection lens 24. The diffusion plate 22 diffuses the source light to regulate the uniformity of the brightness of the source light, and then emits the source light toward the projection lens 24.

The projection lens 24 is a transparent convex lens made of a synthetic resin, glass, etc. The projection lens 24 is disposed between the diffusion plate 22 and the liquid crystal panel 26. The projection lens 24 collects the source light from the diffusion plate 22 and projects the source light toward the liquid crystal panel 26.

The liquid crystal panel 26 is a transmissive-type liquid crystal display that receives the source light from the direction of the light source 12, and allows a portion of the source light to transmit therethrough to form the image. Then, this image is emitted as light toward the plane mirror 28. Specifically, the liquid crystal panel 26 is a dot matrix type thin film transistor (TFT) liquid crystal panel formed of a plurality of liquid crystal pixels arranged in two dimensional directions. The source light from the projection lens 24 passes through a polarizer (not illustrated) in the liquid crystal panel 26 and is converted into a linear polarization light having a particular polarization direction. In the present embodiment, this particular polarization direction is at 45° with respect to the horizontal direction of the image. It should be noted that "polarization direction" in the present embodiment refers to the oscillation direction of electromagnetic waves for linear polarization light, and refers to the long axis of the ellipse at maximum amplitude of electromagnetic waves for elliptical polarization light.

In this regard, the projector 16 projects linear polarization source light toward the plane mirror 28.

As shown in FIG. 2, the plane mirror 28 may be formed by depositing a reflection surface 28a, which may be aluminum or the like, on the surface of a substrate, which may be a synthetic resin, glass, etc. The reflection surface 28a is a smooth, level surface. The plane mirror 28 reflects the source light from the liquid crystal panel 26 toward the concave mirror 30.

The concave mirror 30 may be formed by depositing a reflection surface 30a, which may be aluminum or the like, on the surface of a substrate, which may be a synthetic resin, glass, etc. The reflection surface 30a is a concave surface that is concaved at the center of the concave mirror 30. The reflection surface 30a is a smooth, curved surface. The concave mirror 30 reflects the source light from the plane mirror 28 toward the projection member 40.

In the first embodiment, the projection member 40 is a sheet of glass joined to the windshield of the vehicle 1, and is integrally formed with the vehicle 1. As shown in the magnified view of FIG. 4, the projection member 40 includes a first transparent plate 42 on the front side, a second transparent plate 44 on the rear side, and a waveplate 46 interposed between the first transparent plate 42 and the second transparent plate 44. In this case, the front side of the projection member 40 faces the passenger, and the rear side of the projection member 40 is opposite from the front side.

Figure 4:
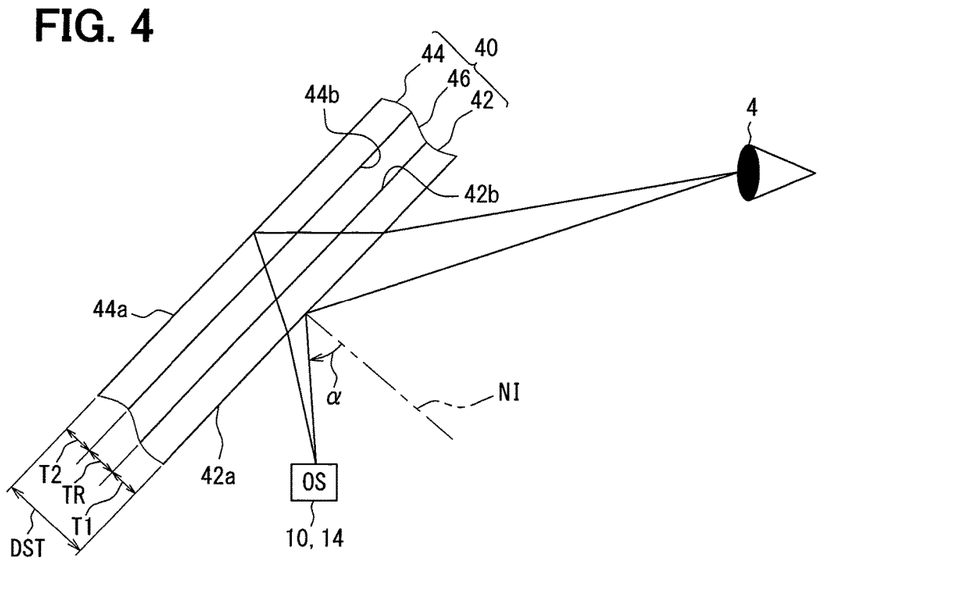
FIG. 4 is a schematic view for explaining the reflections of a source light, which is emitted toward a first surface, at the first surface and a second surface, and partially shows a cross section of a projection member along a plane of incidence according to a first embodiment.

The first transparent plate 42 is formed as a transparent sheet of, e.g., glass, and is disposed in front of the waveplate 46 in the projection member 40. The front side of the first transparent plate 42 forms a first surface 42a that acts as a boundary with the cabin space of the vehicle 1. In the first embodiment, the image is projected onto a smooth and flat portion of the first surface 42a. Meanwhile, the rear side of the first transparent plate 42 forms a flat joining surface 42b that is joined to the waveplate 46. In this regard, the first transparent plate 42 acts as a medium that substantially maintains the polarization state of the source light passing therethrough.

The second transparent plate 44 is formed as a transparent sheet of, e.g., glass, and is disposed behind the waveplate 46 in the projection member 40. The rear side of the second transparent plate 44 forms a second surface 44a that acts as a boundary with the air outside of the vehicle 1. In the first embodiment, the image is projected onto a smooth and flat portion of the second surface 44a. Meanwhile, the front side of the second transparent plate 44 forms a flat joining surface 44b that is joined to the waveplate 46. In this regard, the second transparent plate 44 acts as a medium that substantially maintains the polarization state of the source light passing therethrough. The waveplate 46 is a transparent sheet or film made from, e.g., a synthetic resin. The waveplate 46 is joined to the joining surfaces 42b, 44b of the first transparent plate 42 and the second transparent plate 44. The waveplate 46 includes a fast axis 46a and a slow axis 46b along directions tangential to the joining surfaces 42b, 44b. The slow axis 46b retards phase with respect to the fast axis 46a. In other words, a refractive index $\eta S$ in a direction along the slow axis 46b is greater than a refractive index $\eta F$ in a direction along the fast axis 46a.

Further, according to the projection member 40, the difference between a refractive index η1 of the first transparent plate 42 and a refractive index η0 of air is set to be greater than the differences between the refractive index η1 and the refractive indices ηF and ηS. Similarly, the difference between a refractive index η2 of the second transparent plate 44 and the refractive index η0 of air is set to be greater than the differences between the refractive index η2 and the refractive indices ηF and ηS.

Further, in the first embodiment, the first surface 42a and the second surface 44a are formed to be substantially parallel to each other with a substantially constant distance DST between each other at any location. Further, a thickness TR of the waveplate is substantially constant.

Figure 5:
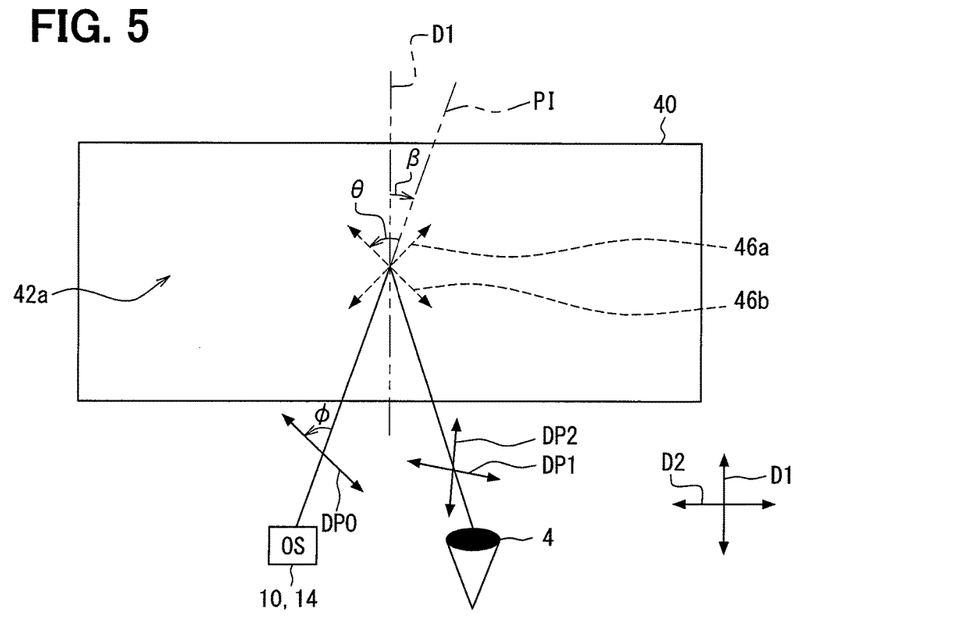
FIG. 5 is a schematic view for explaining source light emitted toward a first surface according to a first embodiment.

As shown in FIGS. 4 and 5, light from the optical system 14 is emitted toward the first surface 42a of the projection member 42 obliquely along a plane of incidence PI. The source light follows a light path that enters the first surface 42a. The first surface 42a includes a normal vector NI at the point of incidence of the source light. The plane of incidence PI in the present embodiment is a plane that includes the light path of the source light and the normal vector NI of the first surface 42a. Further, in the present embodiment, the oscillation components of the electric field in the source light includes an s-polarization component perpendicular to the plane of incidence PI and a p-polarization component parallel to the plane of incidence PI. In this case, the source light is emitted from the optical system 14 into the first surface 42a so as to include both the s-polarization component and the p-polarization component.

The slow axis 46b of the waveplate 46 is positioned to be slanted with respect to the plane of incidence PI.

According to the present embodiment, the projection member 40 and the HUD device 10 mounted in the vehicle 1 are configured such that the source light from the optical system 14 is emitted toward the first surface 42a of the projection member 40 from a direction inclined from an up-down direction D1 of the vehicle 1 toward a left-right direction D2 of the vehicle 1 by an angle β. In other words, the plane of incidence PI is slanted by the angle β with respect to the up-down direction D1 of the vehicle 1. In addition, the source light from the optical system 14 is emitted toward the first surface 42a of the projection member along the plane of incidence PI with an angle of incidence α.

Next, a reference example will be explained for a case where the projection member does not include the waveplate 46, and is a single plate of glass. A simulation of the reference example will be explained below using FIGS. 6 and 7.

Further, as a comparison with the reference example, a simulation of the HUD device 10 and the projection member 40 of the first embodiment will be explained below using FIGS. 8 and 9.

First, the simulation conditions in the first embodiment will be explained. The angle of incidence α is 65°. In addition, the source light emitted from the optical system 14 to the first surface 42a is a linear polarization light having a polarization direction DP0 which is inclined with respect to the plane of incidence PI by an angle φ of 45°. In addition, the source light emitted from the optical system 14 to the first surface 42a has a wavelength λ of 550 nm. Further, the angle of inclination β of the plane of incidence PI in this simulation is −5°. In this case, when the angle of inclination β is negative, the plane of incidence PI is inclined with respect to the up-down direction D1 in the opposite direction as the arrow showing β in FIG. 5 (in other words, the positions of the optical system 14 and the eyes 4 in FIG. 5 are swapped in the left-right direction).

In addition, in the projection member 40, the first transparent plate 42 has a thickness T1 of 5 mm and an index of refraction η1 of 1.51633 with respect to the wavelength λ. Further, the second transparent plate 44 has a thickness T2 of 5 mm and an index of refraction η2 of 1.51633 with respect to the wavelength λ. The thickness TR of the waveplate 46 is 0.2 mm. The retardation value R of the waveplate 46 is λ/2. The angle θ between the slow axis 46b of the waveplate 46 and the plane of incidence PI is 45°.

In addition, in the simulation of the comparative example, the position of the projection member with respect to the HUD device is the same as in the simulation according to the first embodiment. The projection member of the comparative example is a single plate of glass with a thickness of T1+T2+TR. The configuration inside of the HUD device 10 in the simulation for the comparative example meets the same conditions as the simulation according to the first embodiment.

Figure 6:
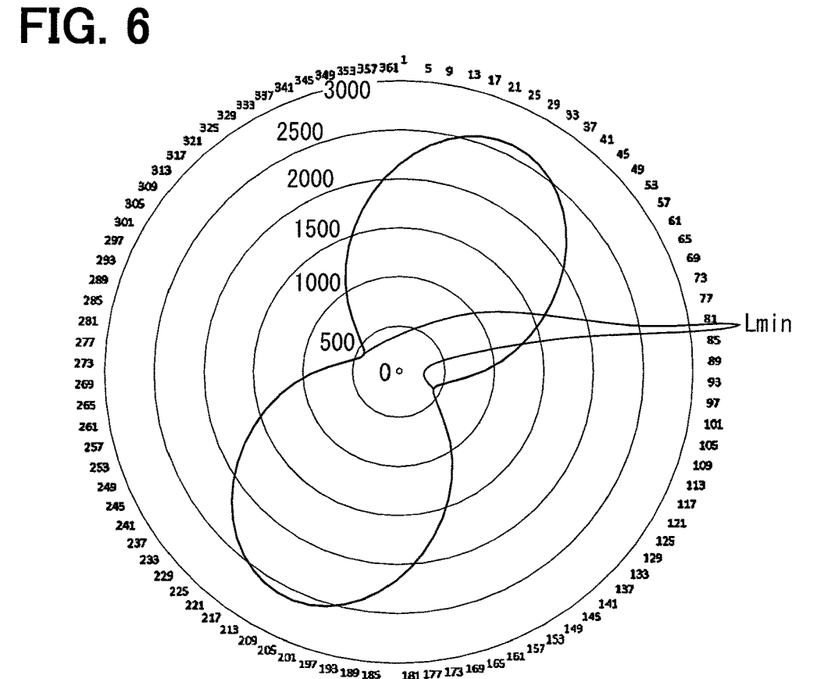
FIG. 6 is a graph showing simulation results in a comparative example.
Figure 8:
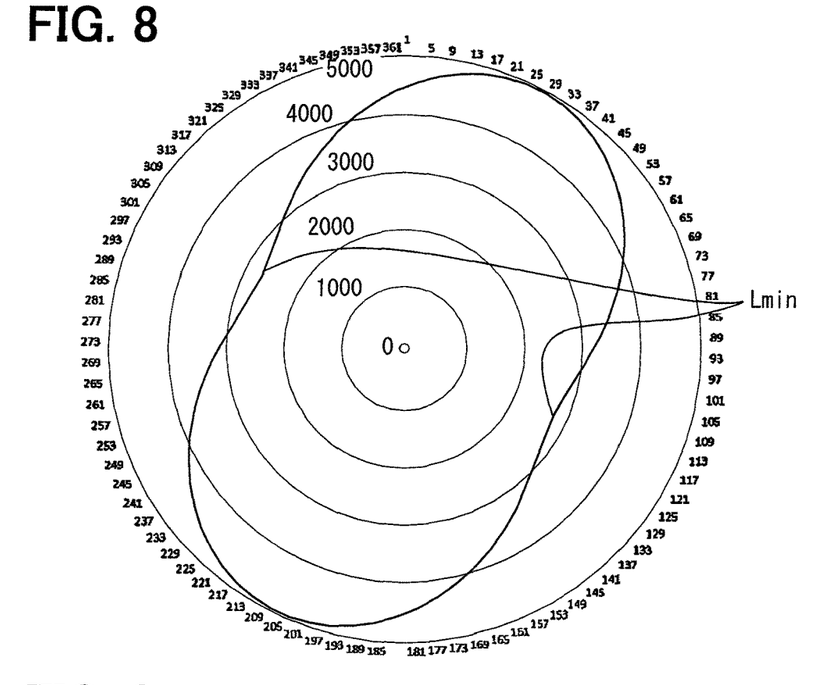
FIG. 8 is a graph showing simulation results in a first embodiment.

The graphs shown in FIGS. 6 and 8 assume that polarized sunglasses are disposed between the projection member and the eyes 4 of the passenger, and this is represented as a polarizing plate 60 (shown as dashed lines in FIG. 1). Further, the graphs in FIGS. 6 and 8 illustrate the brightness of the source light that penetrates the polarizing plate 60 to enter the eyes 4 of the passenger in units of cd/m². The axis in the circumferential direction represents the direction of a transmission axis 60a of the polarizing plate 60 as angles. Specifically, the 0° direction in FIG. 6 represents a direction in which the transmission axis 60a lies on the up-down direction D1 of the vehicle 1, the 90° direction represents a direction in which the transmission axis 60a lies on the left-right direction D2 of the vehicle 1. Further, in typical polarized sunglasses, the direction of the transmission axis 60a is 90°. In addition, the radial axis represents brightness for when the transmission axis 60a is along each direction.

According to the comparative example as shown in FIG. 6, as the transmission axis 60a is rotated, the brightness of the source light that passes through the polarizing plate 60 to enter the eyes 4 of the passenger changes significantly and approaches a minimum value Lmin around an angle of 90°. For an angle of 90° corresponding to typical polarized sunglasses, a brightness of about ⅕ of the peak brightness is obtained. Further, when the passenger is wearing a typical pair of polarized sunglasses and, for example, tilts their head to rotate the transmission axis 60a, the brightness may cross over the minimum value Lmin to further limit visibility.

In contrast, according to the simulation of the first embodiment as shown in FIG. 8, even if the transmission axis 60a of the polarizing plate 60 is rotated, the brightness of the source light that passes through the polarizing plate 60 to enter the eyes 4 of the passenger is greater than that of the comparative example in all directions, and there is little change at the minimum value Lmin. Accordingly, when the passenger is wearing a typical pair of polarized sunglasses and, for example, tilts their head to rotate the transmission axis 60a, the brightness of the virtual image 3 is not expected to change much as compared to the comparative example. Even when the direction of transmission axis 60a of the polarizing plate 60 is at 90°, a brightness of about ½ of more of the peak brightness may be obtained.

Figure 7:
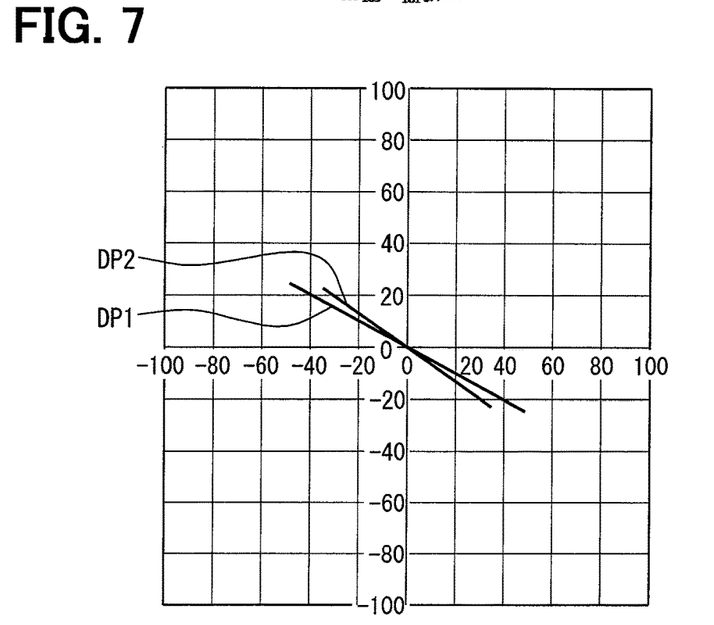
FIG. 7 is a graph showing simulation results in a comparative example.
Figure 9:
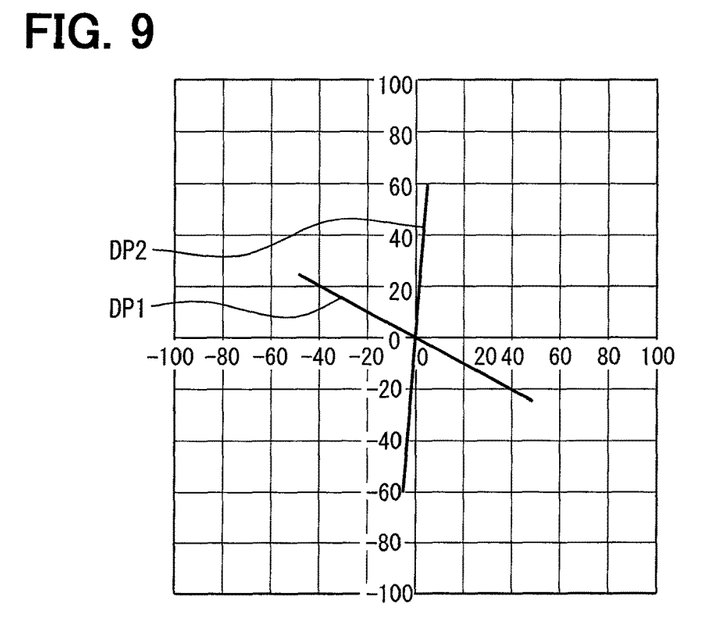
FIG. 9 is a graph showing simulation results in a first embodiment.

The graphs of FIGS. 7 and 9 provide further explanation here. Specifically, polarization directions DP1, DP2 of the source light reflected at each surface will be explained using the graphs of FIGS. 7 and 9. It should be noted that the polarization light in FIGS. 7 and 9 is defined such that source light whose electric field oscillates along the up-down direction D1 of the vehicle 1 is p-polarized light, and source light whose electric field oscillates along the left-right direction D2 of the vehicle 1 is s-polarized light.

According to the comparative example as shown in FIG. 7, the polarization direction DP1 of the source light reflected at the first surface 42a of the front side and the polarization direction DP2 of the source light reflected at the second surface 44a of the rear side are both closer toward s-polarization than the polarization direction DP0 of the source light entering the first surface 42a of the front side.

In contrast, according to the simulation of the first embodiment as shown in FIG. 9, the polarization direction DP1 of the source light reflected at the first surface 42a of the front side is, similar to the comparative example, closer toward s-polarization than the polarization direction DP0 of the source light entering the first surface 42a. However, the polarization direction DP2 of the source light reflected at the second surface 44a of the rear side is, in contrast to the comparative example, closer toward p-polarization than the polarization direction DP0 of the source light entering the first surface 42a.

For the projection member 40 and the HUD device 10 according to the first embodiment, the present inventor further performed simulations for naked eye brightness and for conditions of the waveplate 46 for obtaining sufficient sunglasses brightness. In other words, the present inventor investigated the brightness of the source light entering the eyes 4 of the passenger when changing the retardation value R of the waveplate 46 or when changing the direction of the slow axis 46b. These findings are explained using FIGS. 10 and 11. Here, naked eye brightness in the present embodiment is the brightness of the virtual image 3 observed by the naked eyes of the passenger, whereas sunglasses brightness is the brightness of the virtual image 3 observed by the passenger when wearing typical polarized sunglasses as previously described.

Figure 10:
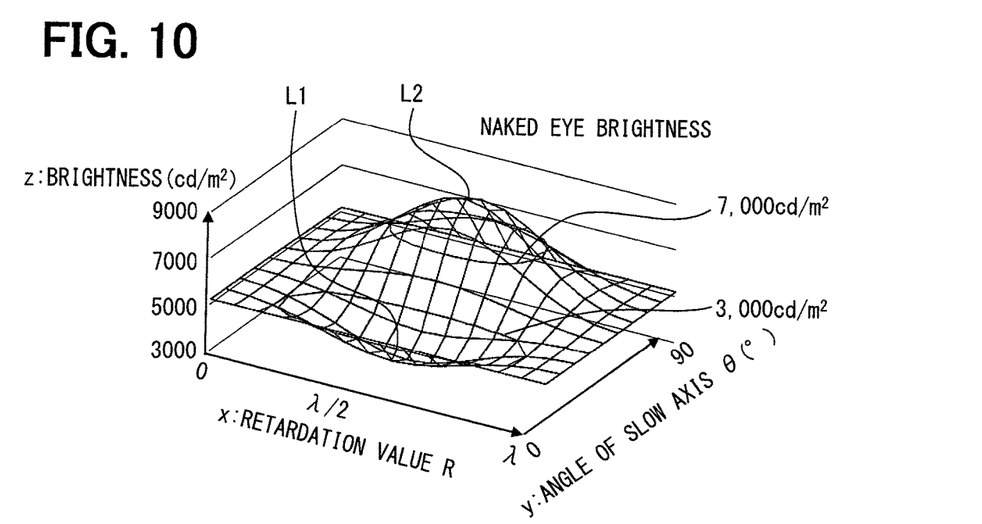
FIG. 10 is a graph showing additional simulation results in a first embodiment.
Figure 11:
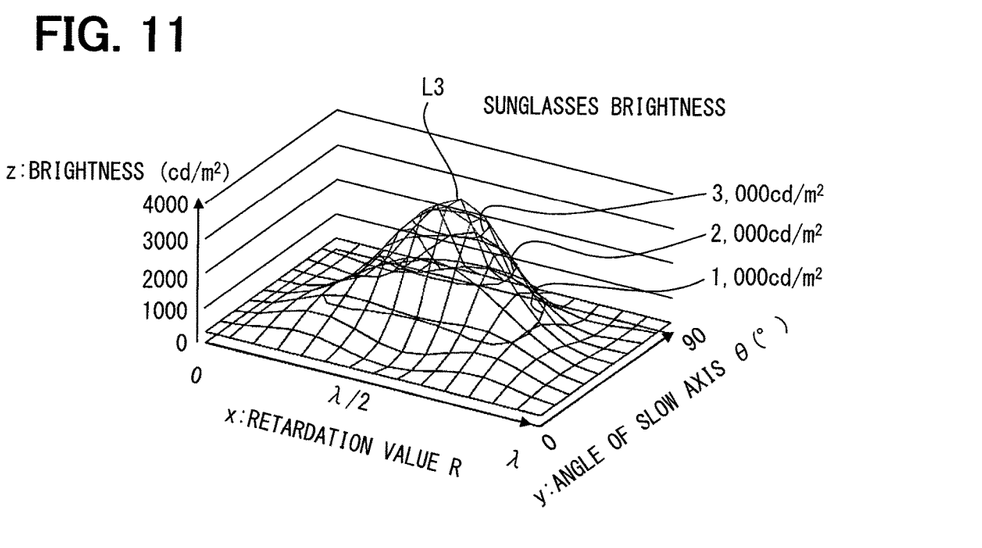
FIG. 11 is a graph showing additional simulation results in a first embodiment.

Next, the conditions for the additional simulations will be explained. The angle of incidence α is 65°. In addition, the source light emitted from the optical system 14 to the first surface 42a is a linear polarization light having a polarization direction DP0 which is inclined with respect to the plane of incidence PI by an angle φ of 45°. In addition, the source light emitted from the optical system 14 to the first surface 42a has a wavelength λ of 550 nm. Further, the angle of inclination β of the plane of incidence PI in this simulation is 5°.

In addition, in the projection member 40, the first transparent plate 42 has a thickness T1 of 5 mm and an index of refraction η1 of 1.51633 with respect to the wavelength λ. Further, the second transparent plate 44 has a thickness T2 of 5 mm and an index of refraction η2 of 1.51633 with respect to the wavelength λ. The thickness TR of the waveplate 46 is 0.2 mm.

Further, the amount of light emitted from the light source 12 of the HUD device 10 is different from the simulations corresponding to FIGS. 8 and 9 described above.

Under these conditions, the retardation value R of the waveplate 46 is varied from 0 to λ, and the direction of the slow axis 46b is varied from an angle of 0° to 90°.

In the graphs of FIGS. 10 and 11, the x-axis shows retardation value R, and the y-axis show the angle θ of the slow axis 46b. Further, the z-axis shows brightness (specifically, naked eye brightness in FIG. 10 and sunglasses brightness in FIG. 11).

As shown in FIG. 10, naked eye brightness has two extreme values L1, L2 when the retardation value R is about λ/2. Around one of the extreme values, a minimum value L1, it is thought that the polarization direction of the source light passing through the waveplate 46 is rotated toward p-polarization as in JP H10-96874 A. In this case, the reflection ratio at the second surface 44a decreases, and the naked eye brightness falls below 5000 cd/m². In contrast, around the other extreme value, a maximum value L2, the naked eye brightness exceeds 7000 cd/m².

As shown in FIG. 11, sunglasses brightness has a maximum value L3 when the retardation value R is about λ/2. Around the maximum value L3, the sunglasses brightness exceeds 1000 cd/m². Further, in the additional simulations as well, the angle θ of the slow axis 46b is with respect to the plane of incidence PI. For example, when the angle θ of the slow axis 46b is 0°, the slow axis 46b is positioned along the plane of incidence PI. When the angle θ of the slow axis 46b is 45°, the slow axis 46b is positioned along the polarization direction DP0 of the source light entering the first surface 42a of the present embodiment. When the angle θ of the slow axis 46b is 90°, the slow axis 46b is positioned orthogonal to the plane of incidence PI.

Accordingly, assuming that the waveplate 46 is configured such that naked eye brightness is higher than when the retardation value R is 0, the slow axis 46b is preferably at 40 to 80° with respect to the plane of incidence PI. Further, the retardation value R is preferably between $2/7*\lambda$ and $5/7*\lambda$ inclusively (i.e., $2/7*\lambda \leq R \leq 5/7*\lambda$). Further, under these conditions, the sunglasses brightness is considered as exceeding 1000 cd/m².

(Operational Effect)

The first embodiment as described above exhibits at least the following operational effects.

According to the projection member 40 of the first embodiment, the first transparent plate 42 which maintains polarization state includes the first surface 42a on the front side. The source light, which includes both an s-polarization component and a p-polarization component, enters the first surface 42a obliquely along the plane of incidence PI. Primarily the s-polarization component of the source light is reflected at the first surface 42a, and primarily the p-polarization component passes through the first transparent plate 42. Here, the waveplate 46 is interposed between the first transparent plate 42 and the second transparent plate 44. The waveplate 46 includes the slow axis 46b which is inclined with respect to the plane of incidence PI. Due to the effect of this waveplate 46, the polarization direction of the source light which primarily includes the p-polarization component that passed through the first transparent plate 42 is rotated toward s-polarization. Further, the second transparent plate 44 includes the second surface 44a on the rear side, and due to the second transparent plate 44 which maintains polarization state, the source light which passed through the waveplate 46 and was rotated toward s-polarization is reflected toward the front side at the second surface 44a with a high reflection ratio. Accordingly, it is possible to increase the brightness of the virtual image 3 observed by the passenger. Accordingly, the visibility of the virtual image 3 may be increased.

In addition, the source light reflected at the second surface 44a of the rear side passes through the waveplate 46 again, and the polarization direction of this source light is rotated back toward p-polarization due to the effect of the waveplate 46, which includes the slow axis 46b that is tilted with respect to the p-polarization plane of incidence PI. Accordingly, especially when the passenger is wearing typical polarization sunglasses, both source light primarily including s-polarization component reflected at the first surface 42a of the front side and source light primarily including p-polarization component reflected at the second surface 44a of the rear side enter the typical polarization sunglasses, so that the virtual image 3 may be observed.

Further, according to the first embodiment, the slow axis 46b may preferably be set to 40° to 80° with respect to the plane of incidence PI, the polarization direction of the source light is reliably rotated toward s-polarization, thus the brightness of the virtual image 3 observed by the passenger may be increased.

Further, according to the first embodiment, the condition of /7*λ≤R≤⅝*λ may be preferably satisfied. Due to this, it is possible to avoid the source light which passes through the first transparent plate 42 to remain as primarily p-polarization component, thus the visibility of the virtual image 3 may be increased.

Further, according to the HUD device 10 according to the first embodiment, the light source 12 emits the source light, which is emitted by the optical system 14 into the first surface 42a obliquely along the plane of incidence PI. In addition, the optical system 14 emits the source light to include both an s-polarization component and a p-polarization component. In this regard, primarily the s-polarization component of the source light is reflected at the first surface 42a, and primarily the p-polarization component passes through the first transparent plate 42. Here, the waveplate 46 is interposed between the first transparent plate 42 and the second transparent plate 44. The waveplate 46 includes the slow axis 46b which is inclined with respect to the plane of incidence PI. Due to the effect of this waveplate 46, the polarization direction of the source light which primarily includes the p-polarization component that passed through the first transparent plate 42 is rotated toward s-polarization. Further, the second transparent plate 44 includes the second surface 44a on the rear side, and due to the second transparent plate 44 which maintains polarization state, the source light which passed through the waveplate 46 and which was rotated toward s-polarization is reflected toward the front side at the second surface 44a with a high reflection ratio. Accordingly, it is possible to increase the brightness of the virtual image 3 observed by the passenger. Accordingly, the visibility of the virtual image 3 may be increased.

In addition, the source light reflected at the second surface 44a of the rear side passes through the waveplate 46 again, and the polarization direction of this source light is rotated back toward p-polarization due to the effect of the waveplate 46, which includes the slow axis 46b that is tilted with respect to the p-polarization plane of incidence PI. Accordingly, especially when the passenger is wearing typical polarization sunglasses, both source light primarily including s-polarization component reflected at the first surface 42a of the front side and source light primarily including p-polarization component reflected at the second surface 44a of the rear side enter the typical polarization sunglasses, so that the virtual image 3 may be observed.

Second Embodiment

Figure 12:
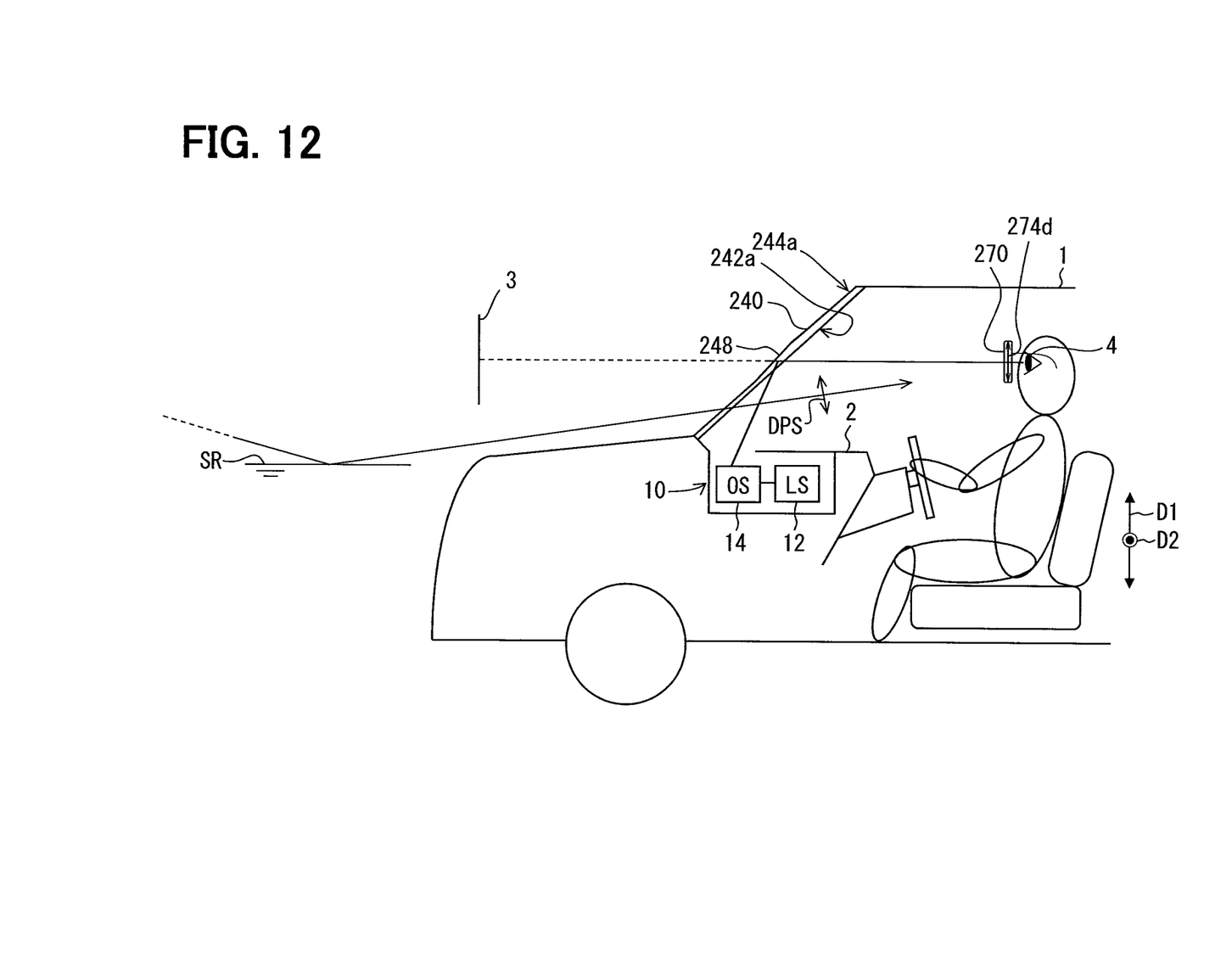
FIG. 12 corresponds to FIG. 1 for a second embodiment.
Figure 13:
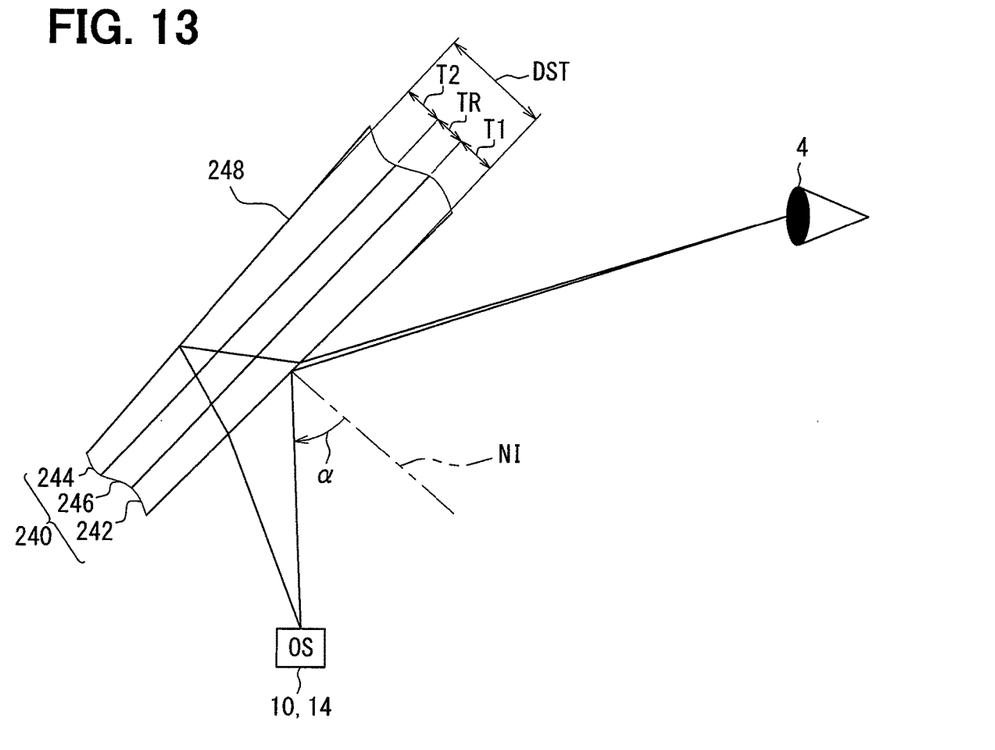
FIG. 13 corresponds to FIG. 4 for a second embodiment.
Figure 14:
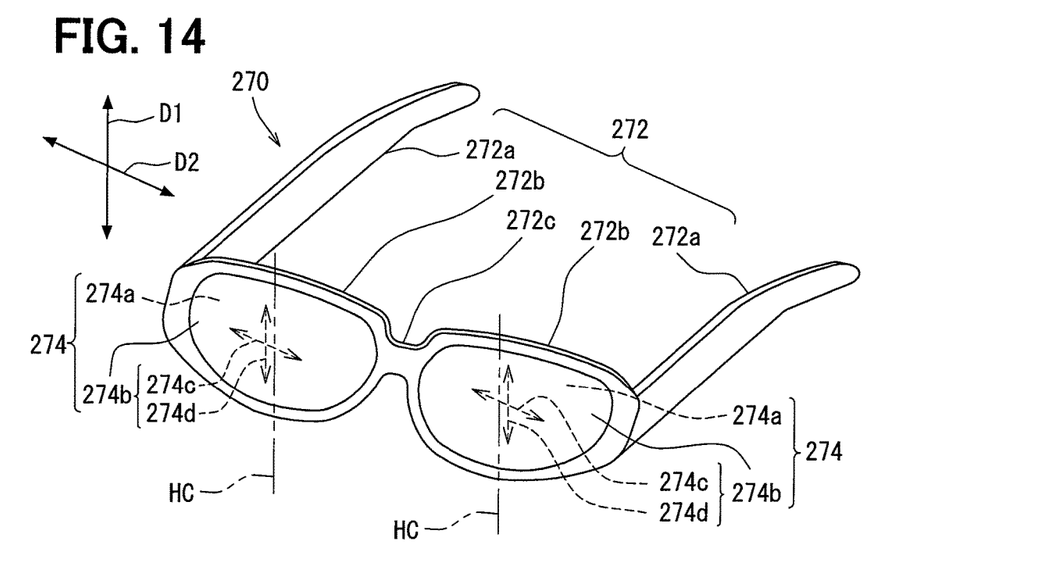
FIG. 14 is a perspective view showing polarized sunglasses in a second embodiment.

As shown in FIGS. 12 to 14, a second embodiment of the present disclosure is a modified example of the first embodiment.

According to a projection member 240 of the second embodiment as shown in FIGS. 12 and 13, a first transparent plate 242, a second transparent plate 244, and a waveplate 246 together form a distance changing portion 248 at a location of the projection member 240 where the image is projected. According to the distance changing portion 248, a distance DST between a first surface 242a and a second surface 244a increases in a direction from an incidence side to a reflection side. According to the present embodiment, the incidence side is toward the incidence of the source light with respect to a location in the plane of incidence PI which is incident to the first surface 242a. The reflection side is toward the reflection of the source light by the first surface 242a with respect to a location in the plane of incidence PI which is incident to the first surface 242a. In other words, the incidence side is toward the incidence of the source light, and the reflection side is toward the reflection of the source light, with the normal vector of the location of incidence interposed therebetween.

According to such a distance changing portion 248, the thickness of the waveplate 246 is formed to be substantially constant. In other words, in the second embodiment, the thicknesses T1, T2 of the first transparent plate 242 and the second transparent plate 244 increase in the direction from the incidence side to the reflection side.

In the second embodiment, according to the HUD device 10 that displays a virtual image that allows a passenger to observe an image by projecting the image onto this projection member 240, as shown in FIG. 12, polarized sunglasses 270 are used by the passenger.

As shown in FIG. 14, the polarized sunglasses 270 includes a frame portion 272 and a pair of polarized filter portions 274. The frame portion 272 includes a pair of temple portions 272a that hang on the ears of the passenger to hold the polarized sunglasses 270, a pair of rim portions 272b that hold the pair of polarized filter portions 274, and a bridge portion 272c that connects the pair of the rim portions 272b. Further, the frame portion 272 is formed to be substantially symmetrical in the left-right direction.

The pair of polarized filter portions 274 suppress incident light from entering the left eye and the right eye of the passenger. Each polarized filter portion 274 is formed by attaching a polarized film 274b as a polarizer on an opposite side from the eyes 4 of the passenger on a substrate 274a formed from a synthetic resin such as polycarbonate. The polarized filter portions 274 may, for example, have a meniscus shape with a convex front surface on the opposite side from the eyes 4 of the passenger and a concave surface on the side toward the eyes 4 of the passenger. Further, the polarized filter portions 274 may or may not have a refractive power that corrects the imaging state of an image (such as the virtual image 3) observed by the passenger.

The polarized film 274b may be, for example, formed by adding iodine to polyvinyl alcohol. Due to the orientation direction of the iodine molecules, the polarized film 274b includes a transmission axis 274c and a blocking axis 274d. When an incidence light is emitted toward the eyes 4 of the passenger, the transmission axis 274c allows this incidence light to pass therethrough according to a polarization direction DPS of this incidence light. The blocking axis 274d blocks this incidence light based on the polarization direction DPS of this incidence light. In the present embodiment, the transmission axis 274c and the blocking axis 274d are substantially orthogonal, and the blocking axis 274d absorbs incidence light.

The direction of the blocking axis 274d is set according to the retardation value R of the waveplate 246 of the projection member 240. For example, in the second embodiment, when R is λ/2 and the angle θ of the slow axis 46b is 45° with respect to the up-down direction D1 of the vehicle 1 which is the moving body, the blocking axis 274d is set to be along the vertical direction. In other words, the blocking axis 274d is set along a vertical center line HC of the frame portion 272 of the polarized sunglasses 270, the vertical center line HC being defined based on the boxing system. Here, the boxing system (refer to Japanese Industrial Standards B7281:2003) is a dimension measurement system based on a rectangle that circumscribes the polarized filter portions 274. Further, λ is the wavelength of the source light used by the HUD device 10.

In the second embodiment explained above as well, the projection member 240 includes the first transparent plate 242 that maintains polarization state and includes the first surface 242a on the front side facing the passenger, the second transparent plate 244 that maintains polarization state and includes the second surface 244a on the rear side opposite to the front side, and the waveplate 246 interposed between the first transparent plate 242 and the second transparent plate 244, the waveplate 246 including the fast axis 46a and the slow axis 46b that delays phase with respect to the fast axis 46a. Further, the source light used by the HUD device 10 is emitted to the first surface 242a obliquely along the plane of incidence PI, and includes both an s-polarization component and a p-polarization component. Further, the slow axis 46b of the waveplate 246 is inclined with respect to the plane of incidence PI. Accordingly, operational effects analogous to those of the first embodiment may be exhibited.

Further, according to the second embodiment, the distance changing portion 248 is formed wherein the distance DST between the first surface 242a and the second surface 244a increases in the direction from the incidence side to the reflection side. Due to this, the reflection direction of the source light which is reflected at the first surface 242a on the front side and the reflection direction of the source light which is reflected at the second surface 244a at the rear side approach each other. Accordingly, it is possible to suppress the formation of a double image due to the virtual image 3 from the reflection at the first surface 242a and the virtual image 3 from the reflection at the second surface 244a. In the distance changing portion 248 which changes the distance DST in this manner, the thickness of the waveplate 246 is constant. Accordingly, the effect of the waveplate 246 is applied in a constant manner over the entire range of the image, and it is possible to suppress unevenness in the brightness of the virtual image 3. Due to the above, it is possible to suppress a double image and unevenness in brightness, and further, to improve the visibility of the virtual image 3.

Further, even when wearing polarized sunglasses, equipped with the vehicle 1, which typically has a blocking axis fixed in the horizontal direction, when external light due to reflection of sunlight on a water surface, a snow surface, etc. in the scenery in front of the vehicle 1 passes through the projection member 240, the polarization direction of this external light is changed due to the waveplate 246. Accordingly, the polarized sunglasses may be rendered ineffective. In this regard, the polarized sunglasses 270 of the second embodiment is configured such that the blocking axis 274d is set in accordance with the retardation value R of the waveplate 246. Accordingly, the polarized sunglasses 270 is able to block bright external light due to reflection of sunlight on a water surface, a snow surface, etc. As a result, the contrast of the virtual image 3 may be increased to improve visibility.

Further, according to the second embodiment, the blocking axis 274d is set to be along the vertical direction. Accordingly, when the retardation value R of the waveplate 246 is $\frac{1}{2}*\lambda$, and the direction of the slow axis 46b is at 45° with respect to the up-down direction D1 of the vehicle 1, bright external light due to reflection of sunlight on a water surface, a snow surface, etc. may be sufficiently blocked. As a result, the contrast of the virtual image 3 may be increased to improve visibility.

Other Embodiments

Above, a plurality of embodiments of the present disclosure are described, but these embodiments are not intended to be limiting, and a variety of embodiments and combinations which do not depart from the gist of the present disclosure are contemplated.

Figure 15:
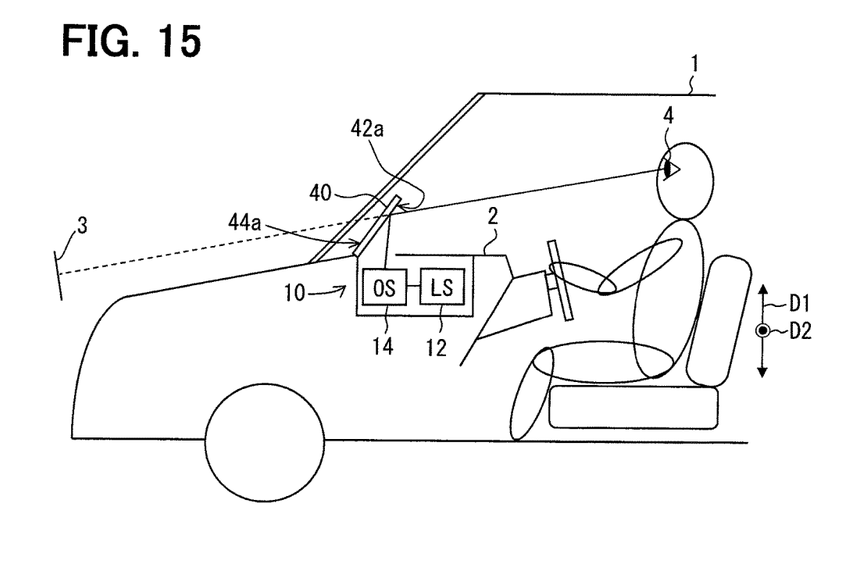
FIG. 15 corresponds to FIG. 1 for a first modified example.

As a first modified example related to the first and second embodiments, the projection member 40 may be separately formed from the windshield of the vehicle 1. As an example of this, as shown in FIG. 15, the projection member 40 may be a combiner provided separately from the windshield and disposed in the vehicle 1.

As a second modified example related to the first and second embodiments, the angle θ of the slow axis 46b with respect to the plane of incidence PI is not limited to 40° to 80°. For example, the angle θ of the slow axis 46b with respect to the plane of incidence PI may be 50° to 60°.

As a third modified example related to the first and second embodiments, the retardation value R of the waveplate 46 is not limited to the range of $\frac{2}{7}*\lambda \leq R \leq \frac{5}{7}*\lambda$. For example, the retardation value R of the waveplate 46 may satisfy $(\frac{2}{7}+n)*\lambda \leq R \leq (\frac{5}{7}+n)*\lambda$, where λ is the wavelength of the source light and n is an arbitrary integer of at least 0. Further, the retardation value R of the waveplate 46 may be outside of the range of $(\frac{2}{7}+n)*\lambda \leq R \leq (\frac{5}{7}+n)*\lambda$ as well.

As a fourth modified example related to the first and second embodiments, the source light may include a plurality of wavelengths, with wavelength λ. For example, due to a color filter (not illustrated) disposed in the liquid crystal panel 26, the wavelength λ of the source light that forms the image may include λ1 corresponding to red, λ2 corresponding to green, and λ3 corresponding to blue. When including a plurality of wavelengths, it is preferably that all $(\frac{2}{7}+n)*\lambda \leq R \leq (\frac{5}{7}+n)*\lambda$ is satisfied with respect to all wavelengths, but $(\frac{2}{7}+n)*\lambda \leq R \leq (\frac{5}{7}+n)*\lambda$ may be satisfied with respect to at least one wavelength instead.

As a fifth modified example related to the first and second embodiments, the optical system 14 of the HUD device 10 is not limited to linearly polarized light and elliptically polarized light, and may emit circular polarized light or randomly polarized light to the first surface 42a instead.

As a sixth modified example related to the first and second embodiments, the entirety of the projection member 40 may be curved to conform with the design of the vehicle 1.

As a seventh modified example, the image projected onto the projection member 40 in the configuration of the first embodiment may be displayed to a passenger wearing the polarized sunglasses 270 of the configuration of the second embodiment. Further, the image projected to the projection member 240 in the configuration of the second embodiment may be displayed to a naked eye passenger or a passenger wearing typical polarized sunglasses as well.

As an eight modified example related to the second embodiment, if the blocking axis 274d is set according to the retardation value R of the waveplate 246, the blocking axis 274d may be set to a direction other than along the vertical direction as well. Here, setting according to the retardation value R of the waveplate 246 means conforming the blocking axis 274d with the polarization direction DPS of the external light which is altered by the waveplate 246 when passing through the projection member 240.

As a ninth modified example related to the first and second embodiments, the present disclosure may be applied to a variety of moving bodies other than the vehicle 1, such as ships, airplanes, etc.

The invention claimed is:

1. A projection member for use with a head up display device mounted in a moving body, the head up display device using a source light to project an image onto the projection member to display a virtual image so that the image is visible to a passenger, comprising:
   a first transparent plate that maintains polarization state, the first transparent plate including a first surface on a front side facing the passenger;
   a second transparent plate that maintains polarization state, the second transparent plate including a second surface on a rear side opposite to the front side; and
   a waveplate interposed between the first transparent plate and the second transparent plate, the waveplate including a fast axis and a slow axis that delays phase with respect to the fast axis, wherein
   the source light is emitted toward the first surface obliquely along a plane of incidence, the source light including an s-polarization component and a p-polarization component, and
   the slow axis of the waveplate is inclined with respect to the plane of incidence.

2. The projection member of claim 1, wherein
   an incidence side is defined as a side from which the source light is emitted toward the first surface, and a reflection side is defined as a side toward which the source light is reflected,
   the first transparent plate, the second transparent plate, and the waveplate together form a distance changing portion in which a distance between the first surface and the second surface increases in a direction from the incidence side to the reflection side, and
   the waveplate in the distance changing portion has a constant thickness.

3. The projection member of claim 1, wherein
   the slow axis is at 40° to 80° with respect to the plane of incidence.

4. The projection member of claim 1, wherein
   when a retardation value of the waveplate is defined as R, a wavelength of the source light is defined as $\lambda$, and n is an arbitrary integer of at least 0,
   $(\frac{2}{7}+n)*\lambda \leq R \leq (\frac{5}{7}+n)*\lambda$ is satisfied.

5. A head up display device mounted on a moving body, the head up display device projecting an image onto a projection member to display a virtual image so that the image is visible to a passenger, comprising:
   a light source that emits a source light; and
   an optical system that projects the source light to the projection member, wherein
   the projection member comprises
      a first transparent plate that maintains polarization state, the first transparent plate including a first surface on a front side facing the passenger,
      a second transparent plate that maintains polarization state, the second transparent plate including a second surface on a rear side opposite to the front side, and
      a waveplate interposed between the first transparent plate and the second transparent plate, the waveplate including a fast axis and a slow axis that delays phase with respect to the fast axis, and
   the light source emits the source light to the first surface obliquely along a plane of incidence, the plane of incidence being inclined with respect to the slow axis, the source light including an s-polarization component and a p-polarization component.

6. The head up display device of claim 5, wherein
   an incidence side is defined as a side from which the source light is emitted toward the first surface, and a reflection side is defined as a side toward which the source light is reflected,
   the first transparent plate, the second transparent plate, and the waveplate together form a distance changing portion in which a distance between the first surface and the second surface increases in a direction from the incidence side to the reflection side, and
   the waveplate in the distance changing portion has a constant thickness.

7. The head up display device of claim 5, wherein
   the slow axis is at 40° to 80° with respect to the plane of incidence.

8. The head up display device of claim 5, wherein
   when a retardation value of the waveplate is defined as R, a wavelength of the source light is defined as $\lambda$, and n is an arbitrary integer of at least 0,
   $(\frac{2}{7}+n)*\lambda \leq R \leq (\frac{5}{7}+n)*\lambda$ is satisfied.

9. Polarized sunglasses for use with a head up display device mounted on a moving body, the head up display device using a source light to project an image onto a projection member to display a virtual image so that the image is visible to a passenger, comprising:
   a polarizer including
      a transmission axis that, when an incident light is emitted toward eyes of the passenger, allows the incidence light to pass through based on a polarization direction of the incident light, and
      a blocking axis that blocks the incidence light based on the polarization direction of the incident light, wherein
   the projection member comprises
      a first transparent plate that maintains polarization state, the first transparent plate including a first surface on a front side facing the passenger,
      a second transparent plate that maintains polarization state, the second transparent plate including a second surface on a rear side opposite to the front side, and
      a waveplate interposed between the first transparent plate and the second transparent plate, the waveplate including a fast axis and a slow axis that delays phase with respect to the fast axis, and
   the blocking axis is set according to a retardation value of the waveplate.

10. The polarized sunglasses of claim 9, wherein
    when the retardation value of the waveplate is defined as R, a wavelength of the source light is defined as $\lambda$, and n is an arbitrary integer of at least 0,
    R is equal to $(\frac{1}{2}+n)*\lambda$, the slow axis is at 45° with respect to an up-down direction of the moving body, and
    the blocking axis is set along a vertical direction.

* * * * *